United States Patent
Moore et al.

(10) Patent No.: US 9,718,325 B2
(45) Date of Patent: Aug. 1, 2017

(54) LATERAL STABILIZATION ASSEMBLY

(71) Applicant: GM GLOBAL TECHNOLOGY OPERATIONS LLC, Detroit, MI (US)

(72) Inventors: Joseph K. Moore, Whitby (CA); Balbir S. Sangha, Ajax (CA); Norman Parker, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/837,445

(22) Filed: Aug. 27, 2015

(65) Prior Publication Data

US 2017/0057318 A1    Mar. 2, 2017

(51) Int. Cl.
*B60G 21/055* (2006.01)

(52) U.S. Cl.
CPC ........ *B60G 21/055* (2013.01); *B60G 2200/34* (2013.01)

(58) Field of Classification Search
CPC .............................................. B60G 2204/1222
See application file for complete search history.

(56) References Cited

U.S. PATENT DOCUMENTS

| | | | | |
|---|---|---|---|---|
| 2,254,261 A * | 9/1941 | Best | ..................... | B60G 11/183 267/273 |
| 6,123,352 A * | 9/2000 | Muzio | ................ | B60G 21/0551 280/124.152 |
| 7,594,670 B2 * | 9/2009 | Dundon | .................. | B60G 7/02 280/124.106 |
| 8,292,312 B2 * | 10/2012 | Kato | .................. | B60G 21/0551 267/141.1 |
| 8,419,033 B2 * | 4/2013 | Kuroda | ............. | B29C 45/14221 280/124.164 |
| 9,016,703 B2 * | 4/2015 | Rowe | ................... | B60G 21/055 267/273 |
| 2007/0194549 A1 * | 8/2007 | Germano | ........... | B60G 21/0551 280/124.107 |
| 2008/0093817 A1 * | 4/2008 | Russell | .............. | B60G 21/0551 280/124.106 |
| 2010/0059958 A1 * | 3/2010 | Johnston | ............. | B60G 21/055 280/124.106 |
| 2011/0175269 A1 * | 7/2011 | Harada | ................. | F16F 1/3835 267/293 |
| 2015/0008630 A1 * | 1/2015 | Ishimatsu | ............ | F16F 1/3835 267/279 |
| 2015/0239319 A1 * | 8/2015 | Kuroda | ............... | B60G 21/055 267/141 |

FOREIGN PATENT DOCUMENTS

| | | | | | |
|---|---|---|---|---|---|
| JP | DE 102006035467 A1 * | 8/2007 | ........ | B60G 21/0551 |
| TR | WO 2015088459 A1 * | 6/2015 | ........ | B60G 21/0551 |

* cited by examiner

*Primary Examiner* — Karen Beck
(74) *Attorney, Agent, or Firm* — Quinn IP Law

(57) ABSTRACT

A lateral stabilization assembly includes a chassis and a stabilizer bar coupled to the chassis. The stabilizer bar includes a central bar portion extending along a bar axis. The lateral stabilization assembly also includes first and second bearings coupled to the chassis. The lateral stabilization assembly also includes a first and second flanges fixed to the central bar portion. The first flange and the second flange are configured to allow a transfer of lateral loads between the first lateral side and the second lateral side of the chassis through the first bearing, the stabilizer bar, and the second bearing.

12 Claims, 3 Drawing Sheets

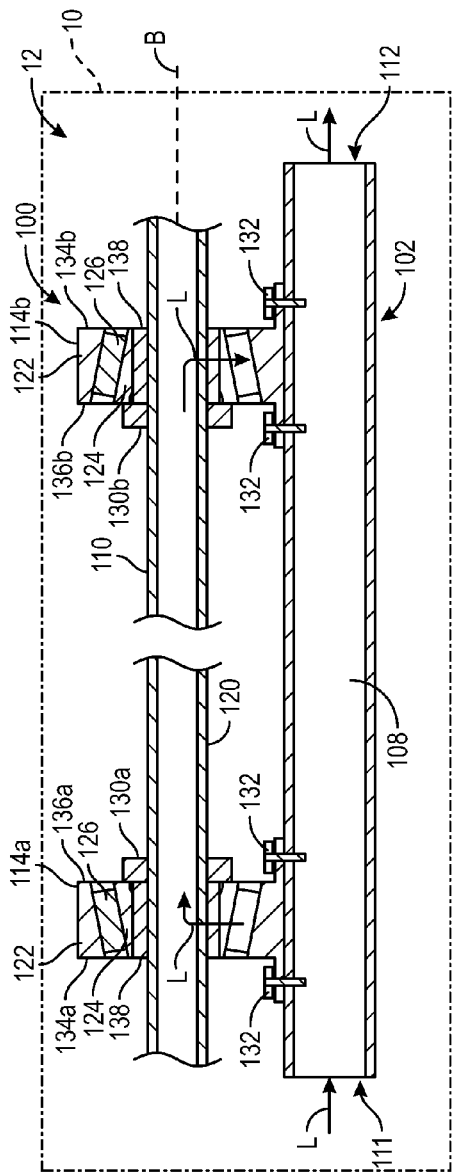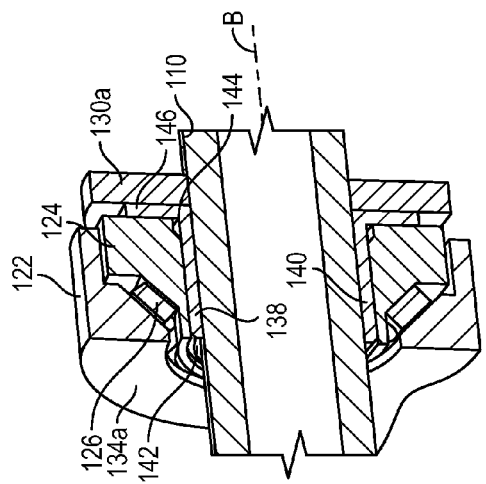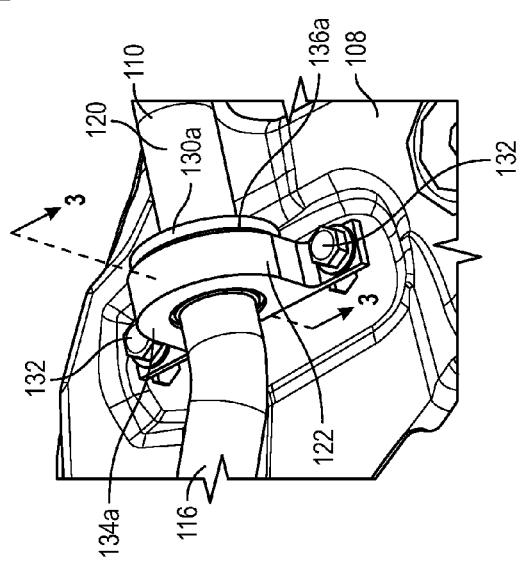

LATERAL STABILIZATION ASSEMBLY

TECHNICAL FIELD

The present disclosure relates to a lateral stabilization assembly for enhancing the lateral stiffness of a vehicle.

BACKGROUND

Vehicles typically include frames to support other vehicle components. For example, an engine cradle may support an internal combustion engine. These frames may be coupled to a suspension system configured to minimize vibrations and stabilize the vehicle during use.

SUMMARY

It is useful to stabilize a vehicle in order to enhance its handling performance. For instance, enhancing the lateral stability of the vehicle may improve the lateral transient handling performance. In other words, the vehicle response to operator inputs improves when the vehicle laterally stability is enhanced. To this end, a vehicle may include the lateral stabilization assembly described in the present disclosure. In one embodiment, the lateral stabilization assembly includes a chassis having a first lateral side and a second lateral side opposite the first lateral side. The lateral stabilization assembly also includes a first bearing coupled to the chassis. The lateral stabilization system further includes a stabilizer bar engaging the first and second bearings. The stabilizer bar includes a central bar portion extending along a bar axis. The first and second bearings are coupled to the chassis, such that the first and second bearings remain stationary relative to the chassis. The stabilizer bar extends through the first bearing and the second bearing such that the first and second bearings couple the stabilizer bar to the chassis while allowing the stabilizer bar to rotate relative to the chassis about the bar axis with the central bar portion extending disposed between the first bearing and the second bearing. The lateral stabilization assembly also includes a first flange and a second flange fixed to the central bar portion. The first flange is proximal to the first bearing, and the second flange is proximal to the second bearing. For example, the first flange may abut the first bearing, and the second flange may abut the second bearing. The first flange and the second flange are configured to transfer lateral loads between the first lateral side and the second lateral side of the chassis through the first bearing, the stabilizer bar, and the second bearing. Although the lateral stabilizing assembly is described in connection with a terrestrial vehicle, it is envisioned that this assembly may also be used with an aircraft, an appliance, farm equipment, or any other apparatus in need of lateral stabilization.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic, front cross-sectional view of a lateral stabilization assembly for a vehicle, wherein the lateral stabilization assembly includes a chassis, a stabilizer bar, and a plurality of thrust roller bearings coupled between the chassis and the stabilizer bar in order to enhance lateral stability in the vehicle;

FIG. 2 is a schematic, perspective, fragmentary view of the lateral stabilization assembly shown in FIG. 1;

FIG. 3 is a schematic, perspective cross-sectional view of the stabilizer bar and one of the thrust roller bearings shown in FIG. 1, taken along section line 3-3 of FIG. 2;

DETAILED DESCRIPTION

Figure 5:
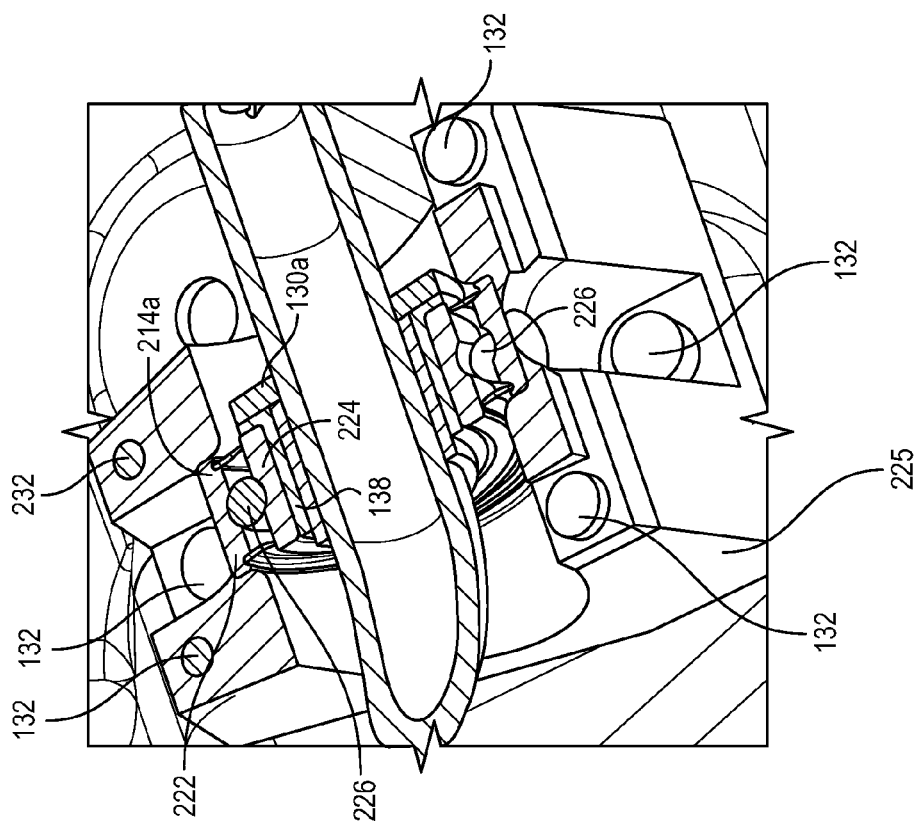
FIG. 5 is a schematic, perspective, cross-sectional view of the lateral stabilization assembly shown in FIG. 4, taken along section line 5-5 of FIG. 4.

Referring to the drawings, wherein like reference numbers correspond to like or similar components throughout the several figures, and beginning with FIGS. 1-3, a vehicle 10, such as car, includes a lateral stabilization assembly 100 for enhancing the lateral stability and rigidity of the vehicle 10, thereby improving its handling performance. In the depicted embodiment, the lateral stabilization assembly 100 is part of the vehicle suspension system 12 and includes a chassis 102 configured to support a vehicle body of the vehicle 10. The chassis 102 is configured as a frame and can serve as an engine cradle in order to support the internal combustion engine of the vehicle 10. To this end, the chassis 102 may be wholly or partly made of a substantially rigid metal, such as steel.

Figure 4:
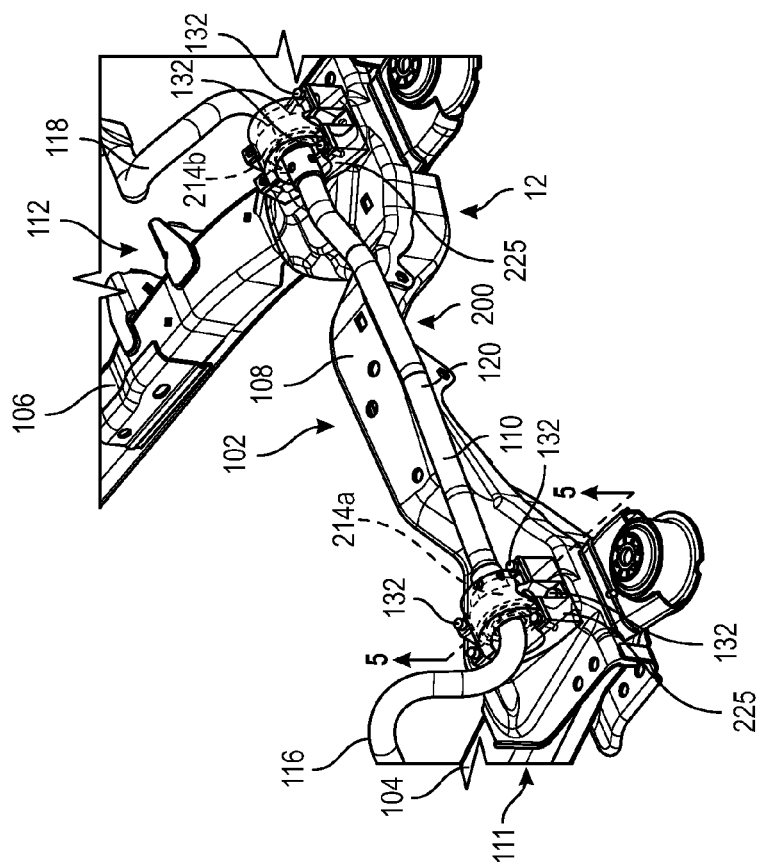
FIG. 4 is a schematic, perspective, fragmentary view of a lateral stabilization assembly in accordance with another embodiment of the present disclosure, wherein the lateral stabilization assembly includes ball bearings.

With reference to FIGS. 1 and 4, the chassis 102 has a first support 104 on a first lateral side 111, a second support 106 on a second lateral side 112, and a third support 108 directly interconnecting the first support 104 and the second support 106. The first support 104, second support 106, and third support 108 can be configured as beams in order to the bear the weight of the vehicle body (and other components) of the vehicle 10. The first support 104 and the second support 106 may be substantially parallel to each other. The third support 108 is substantially perpendicular to the first support 104 and the second support 106 and can extend from the first lateral side 111 to the second lateral side 112 (which is opposite to the first lateral side 111) in order to provide lateral stability to the vehicle 10.

In addition to the chassis 102, the lateral stabilization assembly 100 includes a stabilizer bar 110 coupled to the chassis 102 via a first bearing 114a and a second bearing 114b as discussed in detail below. The stabilizer bar 110 engages the first bearing 114a and the second bearing 114b and includes a first lateral bar portion 116 (FIG. 4), a second lateral bar portion 118 (FIG. 4), and a central bar portion 120 coupled between the first lateral bar portion 116 and second lateral bar portion 118. The central bar portion 120 extends along a bar axis B between the first support 104 and the second support 106 and is substantially parallel to the third support 108 in order to maximize the lateral stability of the vehicle 10.

The central bar portion 120 of the stabilizer bar 110 is coupled to the third support 108 of the chassis 102 only via the first bearing 114a and the second bearing 114b. As a consequence, the lateral loads L on the vehicle 10 can transfer from the first lateral side 111 to the second lateral side 112 of the chassis 102 (and vice-versa) through the central bar portion 120 of the stabilizer bar 110. The first bearing 114a and the second bearing 114b can transmit lateral loads L between the first lateral side 111 and the second lateral side 112 of the chassis 102 while allowing the stabilizer bar 110 to rotate about the bar axis B. To facilitate the transfer of lateral loads L, the lateral stabilization assembly 100 includes a first flange 130a abutting the first bearing 114a and a second flange 130b abutting the second bearing 114b. The first flange 130a may be in direct contact with the first bearing 114a in order to facilitate the transfer of lateral loads L between the first bearing 114a and the stabilizer bar 110. The second flange 130b may be in direct contact with the second bearing 114b in order to facilitate the transfer of lateral loads L between the second bearing 114b and the stabilizer bar 110. Each of the first flange 130a and the second flange 130b is fixed to the stabilizer bar 110 via, for example, welding. The first flange 130a and the second flange 130b can also be mechanically fixed to the stabilizer bar 110. Regardless of the fixing method employed, the first flange 130a and the second flange 130b remain stationary relative to the stabilizer bar 110. In the depicted embodiment, each of the first flange 130a and the second flange 130b has an annular shape and is wholly or partly made of a substantially rigid metal, such as steel, in order to facilitate the transfer of lateral loads L between the first lateral side 111 and the second lateral side 112 of the chassis 102.

Because the stabilizer bar 110 provides lateral stiffness to the vehicle suspension system 12, the mass of the third support 108 can be minimized, thereby saving costs. It is envisioned that the third support 108 (or portions thereof) can be completed eliminated, and the lateral loads L can be transferred solely through the stabilizer bar 110, thereby providing more space for other vehicle components, such as the converter, steering components, and driveline components. Because of the lateral support provided by coupling the stabilizer bar 110 to the chassis 102, no lateral stiffness braces are needed to laterally support the chassis 102. Therefore, mass in the vehicle 10 can be minimized. Moreover, coupling the stabilizer bar 110 to the chassis 102 via the first bearing 114a and the second bearing 114b provides lateral stiffness to the vehicle suspension system 12 while minimizing mass in the vehicle 10.

In the embodiment depicted in FIGS. 1-3, the first bearing 114a and the second bearing 114b are tapered thrust roller bearings and each includes an outer race or housing 122, an inner race 124 disposed inside the housing 122, and a plurality of rollers 126 disposed between the inner race 124 and the housing 122. The housing 122, the inner race 124, and the rollers 126 are wholly or partly made of a substantially rigid material, such as steel, in order to maximize the fatigue life of the first bearing 114a and the second bearing 114b. The inner race 124 has an annular shape and may be referred to as the inner collar.

The housing 122 is directly coupled to the third support 108 (or another part) of the chassis 102, thereby enhancing the lateral stiffness of the vehicle 10. For instance, fasteners 132, such as bolts, can be inserted through the housing 122 and into the chassis 102 in order to couple the housing 122 to the chassis 102. Irrespective of the coupling method, the housing 122 remains stationary relative to the chassis 102 and the stabilizer bar 110. Moreover, the housing 122 surrounds at least the majority of the inner race 124. The inner race 124 supports the rollers 126 and can rotate about the bar axis B as the rollers 126 turn. Therefore, the stabilizer bar 110 can rotate about the bar axis B. However, the stabilizer bar 110 remains axially stationary relative to the bar axis B. In other words, the stabilizer bar 110 cannot move along the bar axis B. The rollers 126 allow the stabilizer bar 110 to rotate about the bar axis B. In the depicted embodiment, the rollers 126 are oriented at an oblique angle relative to the bar axis B in order to maximize the capability of the first bearing 114a and second bearing 114b to withstand axial forces and radial forces.

Each housing 122 includes an outer housing sidewall 134a, 134b and an inner housing sidewall 136a, 136b opposite to the respective outer housing sidewall 134a, 134b. The first support 104 (FIG. 4) is closer to the outer housing sidewall 134a of the first bearing 114a than to the inner housing sidewall 136a of the first bearing 114a. The second support 106 (FIG. 4) is closer to the outer housing sidewall 134b of the second bearing 114b than to the inner housing sidewall 136b of the first bearing 114a. Further, the first flange 130a is closer to the inner housing sidewall 136a of the first bearing 114a than to the outer housing sidewall 134a of the first bearing, thereby facilitating the transfer of lateral loads L between the chassis 102 and the stabilizer bar 110 through the first bearing 114a. In the depicted embodiment, the first flange 130a is in direct contact with the inner housing sidewall 136a of the first bearing 114a in order to facilitate the transfer of lateral loads L between the first bearing 114a and the stabilizer bar 110 via the first flange 130a. The second flange 130b is closer to the inner housing sidewall 136b of the second bearing 114b than to the outer housing sidewall 134b of the second bearing 114b, thereby facilitating the transfer of lateral loads L between the chassis 102 and the stabilizer bar 110 through the second bearing 114b. In the depicted embodiment, the second flange 130b is in direct contact with the inner housing sidewall 136b of the second bearing 114b in order to facilitate the transfer of lateral loads L between the second bearing 114b and the stabilizer bar 110 via the second flange 130b.

The lateral stabilization assembly 100 may additionally include compliant sleeves 138 for dampening the noise. One compliant sleeve 138 is coupled to of the first bearing 114a, and another compliant sleeve 138 is coupled to the second bearing 114b. Each compliant sleeve 138 is disposed between the inner race 124 and the stabilizer bar 110 in order to minimize noise, vibration, and harshness in the vehicle 10. The compliant sleeve 138 is wholly or partly made of a compliant, polymeric material capable of absorbing bending loads on the stabilizer bar 110. The compliant sleeve 138 includes an annular sleeve body 140 disposed around a portion of the stabilizer bar 110. The annular sleeve body 140 may be in direct contact with the stabilizer bar 110 and is configured, shaped, and sized to fit around the region of the stabilizer bar 110 surrounded by either the first bearing 114a or the second bearing 114b. As such, the compliant sleeve 138 balances the bending loads on the region of the stabilizer bar 110 that is surrounded by either the first bearing 114a or the second bearing 114b. In one embodiment, each of the first bearing 114a and the second bearing 114b is pressed fitted onto a respective annular sleeve body 140 of the compliant sleeve 138. The compliant sleeve 138 that is partly disposed within the first bearing 114a may be referred to as the first compliant sleeve, and the compliant sleeve 138 that is partly disposed within the second bearing 114b may be referred to as the second compliant sleeve.

The annular sleeve body 140 defines a first body edge 142 and a second body edge 144 opposite the first body edge 142. The compliant sleeve 138 further includes a sleeve flange 146 protruding radially outwardly from the second body edge 144 of the annular sleeve body 140. The sleeve flange 146 may have an annular shape and is disposed between either the first flange 130a or the second flange 130b and the first bearing 114a or the second bearing 114b, respectively, in order to minimize the noise, vibration, and harshness in the vehicle 10. For example, the sleeve flange 146 may be in direct contact with the first flange 130a (or the second flange 130b) and the first bearing 114a (or the second bearing 114b). Pogo drop links can also be attached to the stabilizer bar 110 and/or the chassis 102 to minimize the noise, vibration, and harshness in the vehicle 10. Further, because the compliant sleeves 138 minimize the noise, vibration, and harshness in the vehicle suspension system 12, no rubber bushings are needed between the chassis 102 and the stabilizer bar 110. Thus, the lateral stabilization assembly 100 is characterized by the absence of bushings (especially rubber bushings) between the chassis 102 and the stabilizer bar 110.

FIGS. 4 and 5 schematically illustrate a lateral stabilization assembly 200 in accordance with another embodiment of the present disclosure. The structure and operation of the lateral stabilization assembly 200 is identical (or at least substantially similar) to the structure and operation of the lateral stabilization assembly 100, except for features described below. In this embodiment, the lateral stabilization assembly 200 includes first and second ball bearings 214a, 214b, such as deep groove ball bearings, between the chassis 102 and the stabilizer bar 110. Each of the first and second ball bearings 214a, 214b includes an annular inner race 224, an annular outer race 222, and a plurality of balls 226 disposed between the annular inner race 224 and the annular outer race 222. Each of the first ball bearing 214a and second ball bearing 214b is entirely contained within an outer casing 225 to securely fix the first ball bearing 214a and the second ball bearing 214b to the chassis 102. The outer casing 225 is directly coupled to the chassis 102. For example, fasteners 132, such as bolts, can directly couple the outer casing 225 to the chassis 102.

Figure 6:
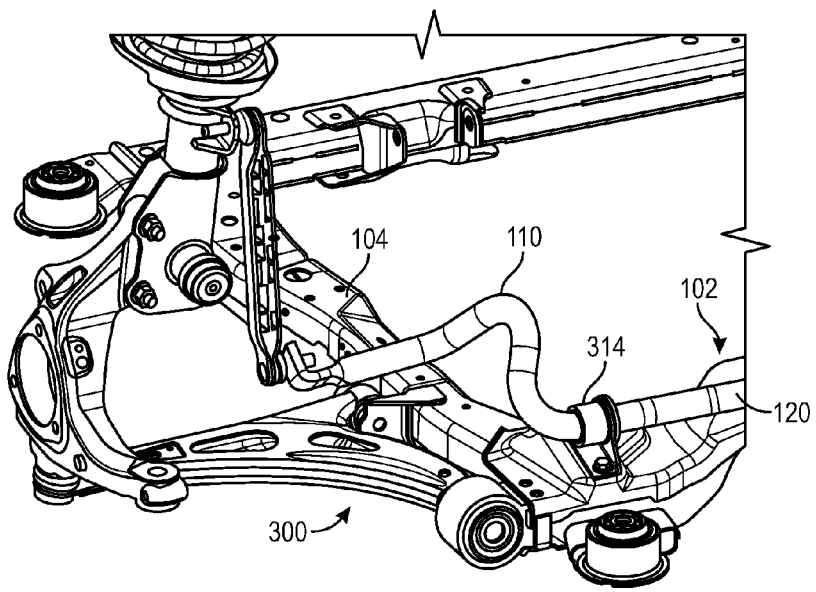
FIG. 6 is a schematic, perspective view of a lateral stabilization assembly in accordance with another embodiment of the present disclosure, wherein the lateral stabilization assembly includes journal bearings.
Figure 7:
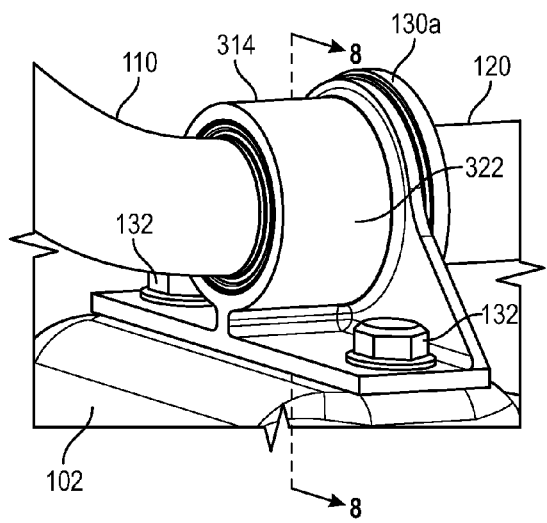
FIG. 7 is a schematic, perspective, fragmentary view of the lateral stabilization assembly of FIG. 6.
Figure 8:
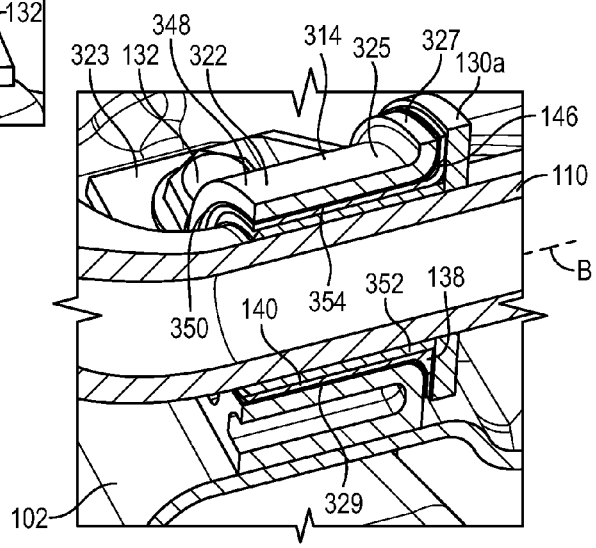
FIG. 8 is a schematic, perspective cross-sectional view of the lateral stabilization assembly of FIG. 6, taken along section line 8-8 of FIG. 7.

FIGS. 6-8 schematically illustrate a lateral stabilization assembly 300 in accordance with another embodiment of the present disclosure. The structure and operation of the lateral stabilization assembly 300 is identical (or at least substantially similar) to the structure and operation of the lateral stabilization assembly 100, except for features described below. In this embodiment, the lateral stabilization assembly 300 includes one or more journal bearings 314 coupled between the chassis 102 and the stabilizer bar 110. The journal bearing 314 allows the stabilizer bar 110 to rotate about the bar axis B and includes an outer housing 322 having a base 323, a bearing body 325 coupled to the base 323, and a bearing flange 327 extending radially outward from the bearing body 325. Although the outer housing 322 is part of the journal bearing 314 in the depicted embodiment, it is contemplated that a separate, split housing may secure the journal bearing 314 between the chassis 102 and the stabilizer bar 110. Further, the journal bearing 314 may include a split bushing. A split housing or a split bushing includes at least two sections coupled to one another by, for example one or more fasteners, in order to facilitate assembly of the journal bearing 314 to the stabilizer bar 110.

The base 323 of the journal bearing 314 is directly coupled to the chassis 102. For example, a fastener 132 may directly couple the base 323 to the chassis 102. The bearing body 325 has a cylindrical shape and defines an outer bearing surface 348 and an inner bearing surface 350 opposite the outer bearing surface 348. The outer bearing surface 348 faces away from the stabilizer bar 110 when the journal bearing 314 is coupled to the stabilizer bar 110. The inner bearing surface 350 defines a bearing opening 354 and faces toward the stabilizer bar 110 when the journal bearing 314 is coupled to the stabilizer bar 110. The inner bearing surface 350 is coated with a polymeric material, such as polytetrafluoroethylene, in order to minimize friction between the stabilizer bar 110 and the journal bearing 314 when the stabilizer bar 110 rotates about the bar axis B. The polymeric material may also coat portions of the bearing flange 327. Therefore, the journal bearing 314 includes a polymeric coating 329 between the bearing body 325 and the annular sleeve body 140 of the compliant sleeve 138. In addition, the polymeric coating 329 extends between the sleeve flange 146 of the compliant sleeve 138 and the bearing flange 327. Moreover, the sleeve flange 146 of the compliant sleeve 138 is disposed between the bearing flange 327 and the first flange 130a (or the second flange 130b), thereby allowing lateral loads L (FIG. 1) to be transferred between the journal bearing 314 and the stabilizer bar 110 through the first flange 130a (or the second flange 130b). An annular spacer 352 may be disposed between the stabilizer bar 110 and the compliant sleeve 138 to facilitate insertion of the stabilizer bar 110 through the journal bearing 314. The annular spacer 352 may be made of a compliant polymeric material to facilitate assembly of the lateral stabilization assembly 300 and to facilitate rotation of the stabilizer bar 110 about the bar axis B.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. For instance, any of the lateral stabilization assemblies described herein may include thrust roller bearings, ball bearings, journal bearings and/or any combination thereof. Accordingly, such other embodiments fall within the framework of the scope of the appended claims.

The invention claimed is:

1. A lateral stabilization assembly for a vehicle chassis, comprising:
   a chassis having a first lateral side and a second lateral side opposite the first lateral side;
   a first bearing and a second bearing coupled to the chassis;
   a stabilizer bar engaging the first and second bearings, wherein the stabilizer bar includes a central bar portion extending along a bar axis;
   the first bearing and the second bearing being coupled to the chassis such that the first and second bearings remain stationary relative to the chassis and the stabilizer bar extends through the first bearing and the second bearing such that the first and second bearings couple the stabilizer bar to the chassis while allowing the stabilizer bar to rotate relative to the chassis about the bar axis with the central bar portion disposed between the first bearing and the second bearing; wherein:
   a first flange and a second flange are fixed to the central bar portion, wherein the first flange is proximal to the first bearing and the second flange is proximal to the second bearing; and
   the first flange and the second flange are configured to transfer lateral loads between the first lateral side and the second lateral side of the chassis through the first bearing, the stabilizer bar, and the second bearing;

further comprising a compliant sleeve at least partially disposed within the first bearing, wherein the compliant sleeve is disposed around the stabilizer bar;

the compliant sleeve is at least partly made of a polymeric material and includes a sleeve body surrounding the stabilizer bar and a sleeve flange coupled to the sleeve body, and the sleeve flange is disposed between the first flange and the first bearing; and the sleeve flange is in direct contact with the first bearing and the first flange in order to allow the transfer of lateral loads between the first bearing and the sleeve flange.

2. The lateral stabilization assembly of claim 1, further comprising a second compliant sleeve at least partially disposed within the second bearing, wherein the second compliant sleeve is disposed around the stabilizer bar.

3. The lateral stabilization assembly of claim 2, wherein the first bearing is press fitted onto the compliant sleeve, the first flange is closer to the first bearing than to the second bearing, and the second flange is closer to the second bearing than to the first bearing.

4. The lateral stabilization assembly of claim 3, wherein the first bearing includes a housing, an inner race disposed inside the housing, and a plurality of rollers disposed between the inner race and the housing, and each of the plurality of rollers is oriented at an oblique angle relative to the bar axis.

5. The lateral stabilization assembly of claim 4, wherein each of the plurality of rollers is in direct contact with the inner race, the inner race has an annular shape, each of the plurality of rollers is in direct contact with the housing, the housing defines an inner housing sidewall and an outer housing sidewall, the inner housing sidewall is closer to the second bearing than the outer housing sidewall, the sleeve flange extends directly from the annular sleeve body, the sleeve body is disposed around the stabilizer bar, the inner race is disposed around the sleeve body, the inner race is in direct contact with the sleeve body, the sleeve body is in direct contact with the stabilizer bar, the sleeve flange is in direct contact with the first flange, and the sleeve flange is in direct contact with the inner race.

6. The lateral stabilization assembly of claim 1, wherein each of the first bearing and the second bearing includes a housing, and the lateral stabilization assembly further includes at least one fastener directly coupling the housing to the chassis.

7. A lateral stabilization assembly for a vehicle chassis, comprising:
a chassis having a first lateral side and a second lateral side opposite the first lateral side;
a first bearing and a second bearing coupled to the chassis;
a stabilizer bar engaging the first and second bearings, wherein the stabilizer bar includes a central bar portion extending along a bar axis;
the first bearing and the second bearing being coupled to the chassis such that the first and second bearings remain stationary relative to the chassis and the stabilizer bar extends through the first bearing and the second bearing such that the first and second bearings couple the stabilizer bar to the chassis while allowing the stabilizer bar to rotate relative to the chassis about the bar axis with the central bar portion disposed between the first bearing and the second bearing; wherein:
a first flange and a second flange are fixed to the central bar portion, wherein the first flange is proximal to the first bearing and the second flange is proximal to the second bearing;
the first flange and the second flange are configured to transfer lateral loads between the first lateral side and the second lateral side of the chassis through the first bearing, the stabilizer bar, and the second bearing; and
the first bearing is a journal bearing, and the journal bearing includes a bearing body, the bearing body having an outer bearing surface and an inner bearing surface opposite the outer bearing surface, the outer bearing surface faces away from the stabilizing bar, the inner bearing surface faces toward the stabilizer bar, and the inner bearing surface is coated with a polymeric material in order to minimize friction between the stabilizer bar and the journal bearing when the stabilizer bar rotates relative to the chassis, the lateral stabilization assembly further includes a compliant sleeve, the compliant sleeve includes an annular sleeve body and a sleeve flange extending from the annular sleeve body, the annular sleeve body is disposed inside the bearing body, and the annular sleeve body is disposed around the stabilizer bar, and the lateral stabilization assembly further includes an annular spacer disposed between the stabilizer bar and the compliant sleeve, and the annular spacer is in direct contact with the stabilizer bar.

8. The lateral stabilization assembly of claim 7, wherein the journal bearing includes a bearing flange extending radially outward from the bearing body, and the sleeve flange is disposed between the bearing flange and the first flange.

9. A vehicle, comprising:
a chassis having a first support, a second support, and a third support interconnecting the first support and the second support;
a first bearing and a second bearing coupled to the chassis;
a stabilizer bar engaging the first and second bearings, wherein the stabilizer bar includes a central bar portion extending along a bar axis between the first support and the second support;
the first bearing and the second bearing being coupled to the chassis such that the first bearing and the second bearing couple the stabilizer bar to the chassis while allowing the stabilizer bar to rotate relative to the chassis about the bar axis with the central bar portion disposed between the first bearing and the second bearing;
a first flange and a second flange fixed to the central bar portion, wherein the first flange abuts the first bearing, and the second flange abuts the second bearing;
a compliant sleeve at least partially disposed within the first bearing, wherein the compliant sleeve is disposed around the stabilizer bar, wherein the compliant sleeve is at least partly made of a polymeric material and includes a sleeve body surrounding the stabilizer bar and a sleeve flange coupled to the sleeve body, and the sleeve flange is disposed between the first flange and the first bearing, and the sleeve flange is in direct contact with the first bearing and the first flange in order to allow a transfer of lateral loads between the first bearing and the sleeve flange;
a second compliant sleeve at least partially disposed within the second bearing, wherein the second compliant sleeve is disposed around the stabilizer bar; and
wherein the first bearing is press fitted onto the compliant sleeve.

10. The vehicle of claim 9, wherein the first bearing and the second bearing are each directly coupled to the chassis.

11. The vehicle of claim 9, wherein each of the first bearing and the second bearing includes a housing, and the vehicle further includes at least one fastener directly coupling the housing to the chassis.

12. The vehicle of claim 9, wherein the first bearing is a journal bearing, and the journal bearing includes a bearing body and a bearing flange extending from the bearing body, the bearing body having an outer bearing surface and an inner bearing surface opposite the outer bearing surface, the outer bearing surface faces away from the stabilizer bar, the inner bearing surface faces toward the stabilizer bar, and the inner bearing surface is coated with a polymeric material to define a polymeric coating in order to minimize friction between the stabilizer bar and the journal bearing when the stabilizer bar rotates relative to the chassis, the vehicle further includes a compliant sleeve, the compliant sleeve includes an annular sleeve body, the annular sleeve body is disposed around the stabilizer bar, the first bearing is press fitted onto the annular sleeve body, the polymeric coating is disposed between the bearing body and the annular sleeve body, the compliant sleeve further includes a sleeve flange extending from the annular sleeve body, the polymeric coating extends between the sleeve flange of the compliant sleeve and the bearing flange, and the vehicle further includes an annular spacer disposed between the stabilizer bar and the compliant sleeve.

\* \* \* \* \*